US011927041B2

(12) United States Patent
Girotto et al.

(10) Patent No.: US 11,927,041 B2
(45) Date of Patent: Mar. 12, 2024

(54) DEVICE FOR SLIDING SUPPORT

(71) Applicant: IRONBOX S.R.L., Spresiano (IT)

(72) Inventors: Adriano Girotto, Spresiano (IT); Luca Cesaretti, Spresiano (IT); Lorenzo Andrea Parrotta, Spresiano (IT); Riccardo Contini, Spresiano (IT)

(73) Assignee: IRONBOX S.R.L., Spresiano (IT)

( * ) Notice: Subject to any disclaimer, the term of this patent is extended or adjusted under 35 U.S.C. 154(b) by 470 days.

(21) Appl. No.: 17/272,434

(22) PCT Filed: Aug. 26, 2019

(86) PCT No.: PCT/IB2019/057151
§ 371 (c)(1),
(2) Date: Mar. 1, 2021

(87) PCT Pub. No.: WO2020/044199
PCT Pub. Date: Mar. 5, 2020

(65) Prior Publication Data

US 2021/0332626 A1 Oct. 28, 2021

(30) Foreign Application Priority Data

Aug. 31, 2018 (IT) ........................ 102018000008268

(51) Int. Cl.
*E05D 15/00* (2006.01)
*E05D 15/06* (2006.01)

(52) U.S. Cl.
CPC .... *E05D 15/063* (2013.01); *E05D 2015/0695* (2013.01); *E05Y 2201/46* (2013.01); *E05Y 2201/64* (2013.01); *E05Y 2900/202* (2013.01)

(58) Field of Classification Search
CPC .......... E05D 2015/0695; E05D 15/063; E05D 15/0621; E05D 15/0652; E05D 15/0678; E05D 15/0686; E05D 15/565; E05D 15/0647; E05F 5/003; E05F 5/10; E05F 1/16; E05F 3/00; E05F 3/02; E05F 3/04; E05F 3/16; E05F 3/18; E05F 1/00;
(Continued)

(56) References Cited

U.S. PATENT DOCUMENTS 3,334,442 A * 8/1967 Boettcher ........... E05D 15/0621 49/404
3,346,993 A * 10/1967 Johnson ................ E05D 15/066 49/419
(Continued)

FOREIGN PATENT DOCUMENTS

CN 206012366 U * 3/2017
DE 202004020969 U1 * 7/2006 ......... E05D 15/0647
(Continued)

*Primary Examiner* — Chuck Y Mah
(74) *Attorney, Agent, or Firm* — Rivka Friedman

(57) ABSTRACT

A supporting device (MC) is described to slidingly support, and linearly move along an axis (X), an object such as e.g. a leaf.
A magnetic return force generated by the cooperation of a magnetic flux generator (54, 56) and an element (10) reactive to the magnetic field, develops.
The element is able to slide relative to the axis (X) during the movement of the object, and has a cross-section (62) which, seen in a plane orthogonal to the axis (X), has a width that varies along the length of the first element (10) parallelly to said axis (X).

20 Claims, 2 Drawing Sheets

(58) Field of Classification Search

CPC ........ E05F 1/02; E05F 1/046; E05Y 2900/20; E05Y 2900/202; E05Y 2800/24; E05Y 2201/408; E05Y 2201/412; E05Y 2201/46; E05Y 2201/418; E05Y 2201/638; E05Y 2201/64; E05Y 2201/684; E05Y 2201/218; E05Y 2201/224; E05Y 2201/212; E05Y 2900/132; A47H 1/08; A47H 15/02; A47H 15/04; A47H 2001/047

See application file for complete search history.

(56) References Cited

U.S. PATENT DOCUMENTS 4,240,489 A * 12/1980 Madsen ................ A47H 15/04 160/345
5,913,401 A * 6/1999 Tamura ................ H02K 49/102 198/619
8,707,626 B2 * 4/2014 Martin ................ E05D 15/0626 49/404
2008/0100152 A1 * 5/2008 Busch .................... E05F 15/60 310/12.25
2008/0209813 A1 * 9/2008 Haab .................. E05D 15/0621 49/360
2009/0044916 A1 * 2/2009 Singiser .............. E05D 15/0682 160/127
2014/0016885 A1 * 1/2014 Rainis ....................... A47F 5/00 384/8
2016/0069116 A1 * 3/2016 Branco Teixeira ..... E05F 15/70 49/31
2018/0148965 A1 * 5/2018 Lam .................... E05D 15/0621
2019/0143840 A1 * 5/2019 Girotto .................. B60L 13/04 104/281
2020/0347658 A1 * 11/2020 Xu ...................... E05D 15/0626

FOREIGN PATENT DOCUMENTS

EP 1647656 A2 * 4/2006 ........... E05D 15/063
WO 2006032157 A1 3/2006

* cited by examiner

DEVICE FOR SLIDING SUPPORT

TECHNICAL FIELD

The invention refers to a device for slidingly supporting and moving an object linearly along an axis. The object is e.g. a door or a leaf for a fixture, for interiors, or for refrigerating rooms, hereinafter chosen as the main example.

BACKGROUND OF THE INVENTION

Refrigerating counters or rooms commonly have one or more sliding doors to open the refrigerated space where the food is stored. Mostly for vertical counters, the doors are large and heavy. To minimize the overall dimensions and avoid hinges, the doors are mounted horizontally sliding back and forth, but not always are easy to use. Their considerable weight requires complicated and expensive guiding systems, often assisted by counterweights, to allow any user to easily use the counter.

To improve thermal efficiency, doors are prevented from opening accidentally by blocking them temporarily through magnetic means, see e.g. U.S. Pat. No. 2,446,336, which however sometimes require too much effort to be unlocked. Both when pulling the door vigorously to unlock the magnetic hook, and when the door closes under the thrust of the counterweights, it can happen that the door slams against the end-of-stroke stops. Bumps of this type damage the counter, so that damping devices are introduced into the structure.

Another drawback of the known art is that the locking/return devices based on molded profiles are subject to rapid wear.

It is understood then that the door structure is very expensive, complicated and nevertheless often not easy to use.

SUMMARY OF THE INVENTION

The main object of the invention is therefore to overcome one or more of these problems, proposing a device to support slidingly and moving an object linearly along an axis, wherein for example the device is easy to build and reliable.

Another object is to provide a device for slidingly supporting and linearly moving a door, e.g. of a refrigerator counter, so as to overcome one or more of the problems mentioned above.

A first aspect of the invention concerns a supporting device for slidingly supporting, and linearly moving along an axis, an object such as a door, comprising:

- an empty channel that extends parallel to the axis,
- a generator of, or means for generating a, magnetic flux for creating a magnetic flux that crosses a segment of the empty channel with magnetic field lines having all the same direction,
- a first element, reactive to the magnetic field, which is mounted in the empty channel extending along said axis,
- the first element being able to slide relatively to the channel parallel to the axis during the movement of the object,
- wherein the first element at said segment has a cross-section that, seen in a plane orthogonal to the axis, has a dimension (width) along the channel width,
- wherein said dimension has a value which varies along the length of the first element parallelly to said axis.

The variation along the axis of the cross-section size, seen in a plane orthogonal to the axis, of the first element induces a magnetic return force between the first element and the magnetic field lines present in the channel segment.

The physical explanation is that at the point where said dimension (or width) of the cross-section reduces (increases), and only at that point, there develops a force tending to move the first element relatively along the axis with respect to the channel so that the segment of the first element with smaller (greater) cross-section exits from (enters) the empty channel, i.e. so that the segment with smaller (larger) cross-section is no longer (is more) hit by magnetic field lines.

In essence, the magnetic force tends to move the system towards an equilibrium condition in which in the whole empty channel the first element has cross-section with larger dimension, corresponding to the configuration with minimum reluctance.

Thus the cross-section of the first element along the axis can be shaped so that it creates a magnetic return force tending to bring the first element and the channel back in a certain relative position, in particular to bring a door back in the closed position.

In general, the cross-section of the first element can be reduced to the case of complete absence (of reactive material) inside the channel. In such case the length along the axis of the segment with variable cross-section of the first element may be less than that of the channel segment with magnetic field lines all in the same direction.

The cross-section of the first element can be reduced in various ways: for example with a step discontinuity or with a smoother tapering.

Said generator of, or the means for generating a, magnetic flux is generally a generator of flux being uniform and always with the same direction in the channel.

To minimize dispersions, the generator is preferably inserted within a magnetic circuit configured to convey the magnetic flux so that the flux crosses the empty channel. Even more preferably, the generator is mounted within a magnetic circuit configured to define said channel, in particular a guide with a U-shaped cross-section.

Said generator of, or the means for generating a, magnetic flux may have different embodiments, e.g. an electromagnet or a permanent magnet arranged at different points of the magnetic circuit.

In particular the said generator of, or the means for generating a, magnetic flux comprises two rows of magnets arranged uniformly along, and parallel to, the axis to determine between the two rows an empty space crossed by magnetic field lines having all the same direction and coming out of a row and entering the other.

According to a preferred variant, the first element comprises a first and a second contiguous portion extending along the axis, wherein in the first portion said cross-section is wider than the respective cross-section of the other portion. In correspondence of the discontinuity between the cross-sections of the two portions there develops the aforementioned magnetic force.

In a variant, the first portion is long, along the axis, at least as much as the channel segment with flux lines.

In a different variant, useful for obtaining a configuration of such balance as to keep the first element still with respect to the channel, the first portion has length, along the axis, equal or slightly less than the channel segment with flux lines.

Preferably the device not only generates a return force but also a force to slidingly support the object in opposition to its weight. To generate this force, said flux generator can be exploited, or an auxiliary magnetic circuit may be provided.

In a preferred variant, the device comprises

- a second pair of equal, parallel and spaced rows of magnets arranged parallel to the axis to create between the two rows an empty space crossed by magnetic field lines coming out of a row and entering the other, and
- a second element, reactive to the magnetic field, which extends parallel to the axis between the two rows of the second pair, the rows of the second pair and the second element being able to slide relatively parallel to the axis to move the object between the two positions, wherein the second element at said space has a cross-section that, seen in a plane orthogonal to the axis, remains constant along the axis but along a direction orthogonal to an imaginary plane that contains the two rows, direction along which the weight of the object acts, has decreasing width as it is farther away from the plane.

The decrease in said width as it is farther away from the plane causes the creation of a magnetic reaction force, directed orthogonally to the plane and towards said space, which tends to bring the second element back into said space if an external force, e.g. the weight of the object, tends to extract it therefrom.

E.g. the second element at said space exhibits a cross-section which, seen in a plane orthogonal to the axis, comprises a T-shaped or + shaped or H-shaped portion.

In a variant, said cross-section of the second element can be obtained by coupling parts of material with different permeability, e.g. a portion of aluminum rail and an iron portion.

The magnets of the second pair may be installed so that within the second space the field lines have all the same direction or alternating direction. In the second case the magnets of the second pair also develop a braking action on the second element thanks to eddy electric currents induced in the second element.

Note however that the magnetic brake can also be obtained by using equally-oriented magnets coupled with conductive material (e.g. aluminum) contained in the rail (e.g. an aluminum coating of an iron portion).

To boost the developed force and/or develop a supporting force exploiting only said magnetic flux generator, preferably also the cross-section of the first element, along a direction orthogonal to an imaginary plane that contains the two rows of magnets and/or the flux lines that cross the channel, has a width which is decreasing as it is farther away from the plane.

The first and second pair of rows preferably lie on respective planes that are parallel, which facilitates the construction of the device and favors the symmetry of the magnetic forces. For the same reason, a row of the first pair and a row of the second pair preferably lie on a plane that is parallel to a plane on which the remaining rows of the first and second pair lie.

The first and second elements are preferably made of ferromagnetic material, e.g. iron, to minimize the circuit's magnetic reluctance in which they are inserted.

The device preferably comprises a third element of which the first and second element are portions. In particular, the third element comprises a portion which joins the first and second elements, such portion being in different material from that of the first and second element, e.g. aluminum. The third element has e.g. H-cross-section of which the two parallel bars of the H are formed by the first and second element.

The device preferably comprises an elongated support with constant U-shaped cross-section, wherein the first and/or second pair of rows are mounted on the inner facing surfaces of the legs of the U. In addition to facilitating the assembly of the magnets and compacting the structure, the elongated support acts to close, with its U-shaped cross-section, a magnetic circuit to which the magnets belong. In other words, the elongated support favors the closing of the magnetic flux along a low reluctance path.

A second aspect of the invention concerns a door or a leaf of a refrigerating cell comprising the device as in one or each of its variants.

A third aspect of the invention concerns a building door or window, comprising the device as in one or each of its variants.

A fourth aspect of the invention concerns a refrigerating cell comprising the device as in one or each of its variants.

A fifth aspect of the invention concerns a door or window of a vehicle or of a passenger compartment comprising the device as in one or each of its variants.

BRIEF DESCRIPTION OF THE DRAWINGS

The advantages of the invention will be clearer from the following description of a preferred embodiment, referring to the enclosed drawing wherein.

DETAILED DESCRIPTION OF THE INVENTION

Figure 1:
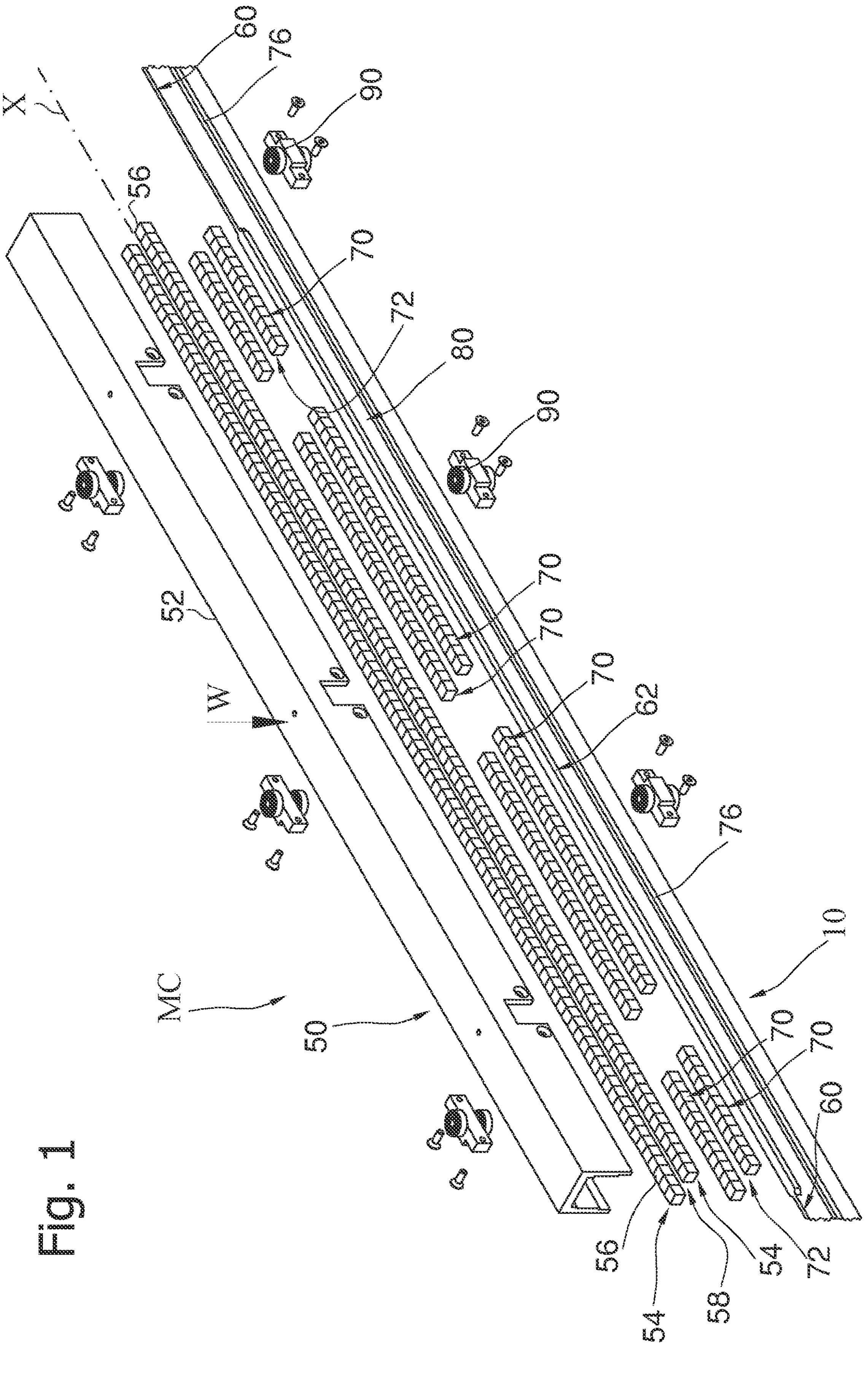
FIG. 1 shows a three-dimensional exploded view of a device.

In the figures, same numbers indicate identical or conceptually similar parts; the letters N and S indicate North and South magnetic poles respectively; and the arrows indicate magnetic flux lines.

The MC device works e.g. to slidably support a door 20 (not shown) along an X axis.

The MC device comprises a fixed rectilinear track 10 and a skid 50, movable on the track 10, which can slide relatively to each other parallel to the X axis while the door is moving. In the example shown the door would be mounted on the skid 50, but the MC device also contemplates reversing the roles of rail 10 and skid 50, so that the first moves and the second remains fixed.

The skid 50 comprises a body 52, having an inverted-U cross-section, inside which there are mounted two identical, parallel and spaced rows 54 of magnets 56 arranged uniformly alongside—and parallel to—the X axis. Thus between the separation of the rows 54 there is created an empty channel 58 crossed by lines of magnetic field being all equally-oriented and coming out of a row 54 and entering in the other (see scheme in FIG. 2*a*, 2*b*).

The fixed track 10 is mounted inside the channel 58.

Figure 3:
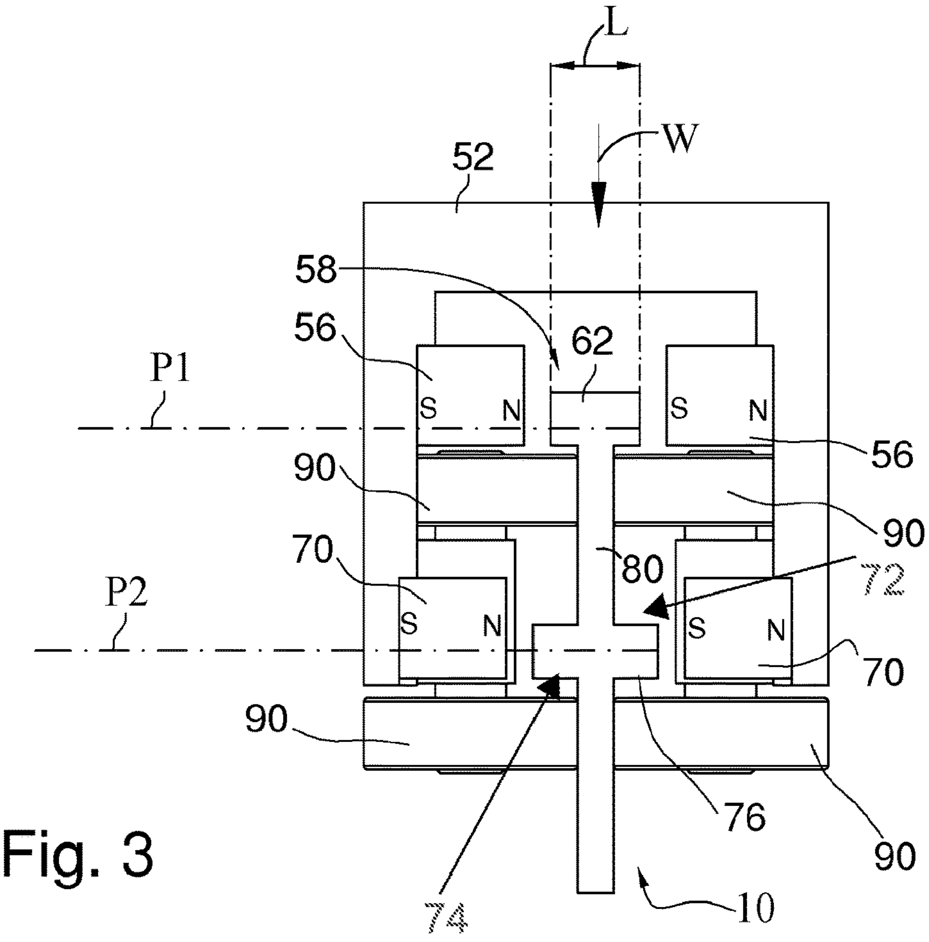
FIG. 3 shows a vertical cross-section of the device as assembled.

The part of the track 10 placed at the channel 58 exhibits a cross-section that, seen in a plane orthogonal to the X axis and measured on the line joining the rows 54 (see plane P1 in FIG. 3), has a width L which varies as a function of the position along the X axis.

The track 10 comprises a first portion 60 and a second portion 62, and said cross-section is larger in the first portion 60 and smaller in the second portion 62.

In the illustrated example the first portion 60 has length along the X axis at least equal to that of the rows 54. In general, the length of the portion 60 must be longer than the rows 54 only if it is desired to guarantee an equilibrium condition at the door's complete opening, otherwise in general this geometric feature is not necessary.

There is a discontinuity between the cross-sections of portions 60, 62 at a point P. This discontinuity can be abrupt, like a step, or it can be gradual as a ramp. A magnetic force develops at point P between the cross-sections of portions 62 and the magnetic field generated by the rows 54 of magnets.

At point P, and only at that one, a force develops tending to relatively shift the track 10 and the rows 54 along the X axis, so that the segment 60 of the track 10 with a smaller cross-section gets out of the empty channel 58, or so that the segment 60 with smaller cross-section is no longer hit by magnetic field lines.

Figure 2A:
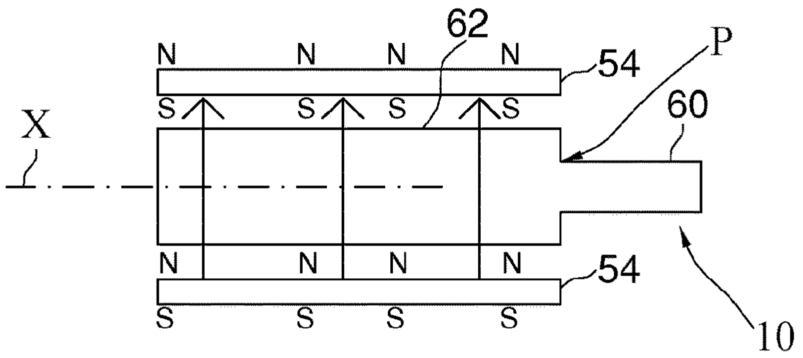
FIG. 2*a*, 2*b* show some parts of the device in plan view.
Figure 2B:
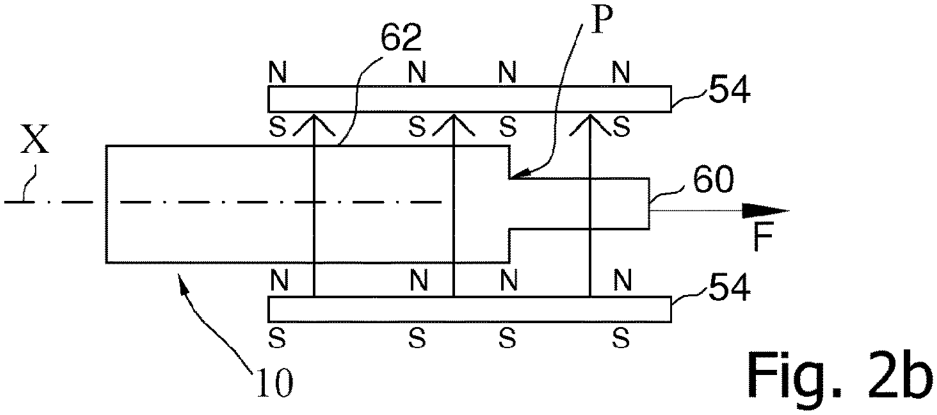

The situation is shown in FIGS. 2*a*. 2*b*.

When only the larger cross-section 62 (FIG. 2*a*) is inside the channel 58, there is no return force.

When (FIG. 2*b*) the cross-section of portion 60 is moved into the channel 58 (toward the left in the drawing), at the point P a return force F is created which tends to oppose the change of position and to bring the system back as in FIG. 2*a* (towards the right in the drawing).

If for example the relative position between the track 10 and the rows 54 of FIG. 2*a* corresponds to the closed-door position, upon opening the door (FIG. 2*b*) the MC device generates a force F which returns the door to the closed position.

The force F has a nearly constant magnitude, independently of the position of the point P between the rows 54.

The variation in cross-section entails a variation in reluctance of the magnetic circuit; the magnitude of the force remains almost constant since it is linked to the reluctance variation, which is constant too.

Clearly, everything also applies to a movement along the other direction on the X axis (that is, turning FIGS. 2*a*, 2*b* by 180°), being enough that the track has a symmetrical shape with respect to a plane orthogonal to the X axis. It is the case of FIG. 1, in which a magnetic force F tending to bring back the skid 50 to the center of the track 10 is generated, because the track 10 has two points of discontinuity for the cross-sections of portions 60, 62 which are far apart at least as the length along X of the skis 50.

Preferably the MC device also generates a force to slidingly support the skid on the track 10.

To generate such force that opposes the load W, e.g. the track 10 in correspondence of the cross-sections of portions 60, 62 comprises a T-shaped portion or a portion with the shape of H or +, or in general such cross-section, along a direction orthogonal to an imaginary plane P1 containing the two rows 54, has decreasing width as it is farther away from the plane. In other words, preferably the cross-sections of portions 60, 62, along a direction orthogonal to the plane P1, have a width which is decreasing as it is farther away from the plane. P1. So this portion of the MC device also generates load-bearing force.

To increase the supporting force, the skid 50 preferably comprises a second pair of equal, parallel and spaced-apart rows 70 of magnets arranged parallel to the X axis to create between the two rows 70 a second empty space 72 crossed by magnetic field lines coming out of one row 70 and entering the other. In the space 72 there is a second element 74 of the track 10 which is reactive to the magnetic field and extends parallel to the X axis between the two rows 70.

The cross-section of the track 10 that slides inside the space 72 exhibits a cross-section 76 which, seen in a plane orthogonal to the X axis, remains constant along the X axis but, along a direction orthogonal to an imaginary plane P2 that contains the two rows 70, has width which decreasing as it is farther away from the plane P2.

In the illustrated example, the cross-section 76 is comprised in a portion having the shape of a +. Other variants envisage e.g. a cross-section 76 in the shape of a T or H, and/or the use of different material for various parts of the cross-section 76.

As illustrated, it is preferred that the cross-sections 60, 62 and the cross-section 76 belong to a single piece, e.g. a section-bar for simplicity of construction, or in any case develop from the same plane.

By the physical principles described in PCT/IB2017/052588, when the cross-section 76 moves away from plane P2 a magnetic reaction force is created, directed orthogonally to the plane P2 and towards the space 72, which tends to bring the cross-section 76 back inside the space 72. Thus the weight W of the object is opposed.

Always for the same reason, the variation along the direction of the load entails a variation of the reluctance that generates a magnetic reaction force which tends to bring the system back into the minimum reluctance configuration. Therefore an equilibrium position is reached in which the magnetic force balances the load.

The invention claimed is:

1. A supporting device to slidingly support, and linearly move along an axis an object, comprising:
- an empty channel extending parallel to the axis,
- a magnetic flux generator for creating a magnetic flux that crosses a segment of the empty channel with magnetic field lines which are all equally-oriented,
- a first element, reactive to the magnetic field, which is arranged in the empty channel and which extends along said axis,
- the first element being configured to slide relative to the channel parallel to the axis during the movement of the object,
- wherein the first element in correspondence of said channel segment has a cross-section which, seen in a plane orthogonal to the axis, has a dimension along the width of the channel,
- the first element having a length considered along said axis,
- wherein said dimension has a value that varies along the length of the first element parallel to said axis so that where said dimension reduces or increases there develops a force tending to move the first element relatively along the axis with respect to the channel in order to bring the first element and the channel back in a certain relative position.

2. The device according to claim 1, wherein the generator is inserted inside a magnetic circuit configured for conveying the magnetic flux so that the flux passes through the empty channel, and defining said channel.

3. The device according to claim 1, wherein the generator comprises two rows of magnets arranged uniformly along, and parallel to, said axis for determining between the two rows an empty space, within the channel, crossed by all equally-oriented magnetic field lines coming out from a row and entering the other.

4. The device according to claim 3, comprising an elongated support with constant U-shaped cross-section, wherein the first and second pair of rows are mounted on the inner facing surfaces of the legs of the U.

5. The device according to claim 3, comprising a second pair of equal, spaced and parallel rows of magnets arranged parallel to the axis for creating in the middle of the two rows an empty space crossed by magnetic field lines emerging from one row and entering the other, and a second element, reactive to the magnetic field, which extends parallel to the axis between the two rows of the second pair, the rows of the second pair and the second element being able to slide relatively parallel to the axis to move the object between two positions, wherein the second element in correspondence of said space has a cross-section which, seen in a plane orthogonal to the axis, remains constant along the axis but along a direction orthogonal to an imaginary plane which contains the two rows, direction along which a load acts, has a width which along said orthogonal direction is decreasing as it is farther away from the plane.

6. The device according to claim 5, wherein the second element at said empty space exhibits a cross-section which, seen in a plane orthogonal to the axis, comprises a T-shaped or plus-sign-shaped or H-shaped portion.

7. The device according to claim 6, wherein said cross-section of the second element is obtained by coupling parts of material with different magnetic permeability.

8. The device according to claim 5, wherein the first and second elements are made of ferromagnetic material.

9. The device according to claim 5, comprising a third element of which the first and second element are portions.

10. The device according to claim 9, wherein the third element comprises a portion which joins the first and second elements, such portion being in different material from that of the first and second element.

11. The device according to claim 9, wherein the third element has H-shaped cross-section of which two parallel bars of the H are formed by the first and second element.

12. The device according to claim 5, wherein the magnets of the second pair are installed so that inside the second space the field lines have alternate direction.

13. The device according to claim 1, wherein the first element comprises a first and a second contiguous portion which extend along the axis wherein in the first portion said cross-section is wider than the respective cross-section of the other portion.

14. The device according to claim 13, wherein the first portion is along the axis at least as long as the channel's segment with flux lines.

15. The device according to claim 13, wherein the first portion has a length, along the axis equal or slightly lower than the channel's segment with flux lines.

16. The device according to claim 1, wherein the cross-section of the first element, along a direction orthogonal to an imaginary plane that contains the two rows of magnets and/or the flux lines that cross the channel, has a width which along said orthogonal direction is decreasing as it is farther away from the plane.

17. A device according to claim 1, wherein the cross-section of the first element is reduced by a step discontinuity or by a smoother tapering.

18. The device according to claim 1, wherein said magnetic flux generator is an electromagnet or a permanent magnet arranged at different points of the magnetic circuit.

19. The device according to claim 1, comprising an elongated support with constant U-shaped cross-section, wherein the first pair of rows are mounted on the inner facing surfaces of the legs of the U.

20. The door or leaf of refrigerating unit, or building door or window, or door or window of a vehicle, or door or window of a passenger compartment, comprising the device according to any of the previous claims.

* * * * *